US012789810B2

(12) United States Patent
Kim

(10) Patent No.: US 12,789,810 B2
(45) Date of Patent: Nov. 10, 2026

(54) METHOD FOR CONTROLLING ENTRY OF TRAVELING VEHICLE INTO INTERSECTION ACCORDING TO SHADED AREA SETTING AT NON-TRAFFIC LIGHT INTERSECTION AND APPARATUS THEREOF

(71) Applicant: HL Klemove Corp., Incheon (KR)

(72) Inventor: Jae Hwan Kim, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 357 days.

(21) Appl. No.: 18/379,389

(22) Filed: Oct. 12, 2023

(65) Prior Publication Data

US 2024/0391462 A1 Nov. 28, 2024

(30) Foreign Application Priority Data

May 22, 2023 (KR) ........................ 10-2023-0065519

(51) Int. Cl.
*B60W 30/18* (2012.01)
*H04W 4/44* (2018.01)

(52) U.S. Cl.
CPC .... *B60W 30/18159* (2020.02); *B60W 30/181* (2013.01); *H04W 4/44* (2018.02); *B60W 2556/45* (2020.02)

(58) Field of Classification Search
CPC ..... B60W 30/18159; B60W 30/18154; B60W 30/181; B60W 30/165; B60W 2520/00;
(Continued)

(56) References Cited

U.S. PATENT DOCUMENTS 11,292,486 B2 * 4/2022 Zhang .................. G05D 1/0231
11,860,639 B2 * 1/2024 Chen .................. G01C 21/3811
(Continued)

FOREIGN PATENT DOCUMENTS

CN 110603497 A * 12/2019 ............ B60W 40/04
CN 112937565 A * 6/2021 ............... B60Q 9/00
(Continued)

OTHER PUBLICATIONS

Qiao, Fengxiang, et al. "A rfid based e-stop sign and its impacts to vehicle emissions." 2012 15th International IEEE Conference on Intelligent Transportation Systems. IEEE, (Year: 2012).*
(Continued)

*Primary Examiner* — Cuong H Nguyen
(74) *Attorney, Agent, or Firm* — Hauptman Ham, LLP

(57) ABSTRACT

The present disclosure discloses a method for controlling entry of a traveling vehicle into an intersection according to a shaded area setting at a non-traffic light intersection and an apparatus thereof, and the method is performed by an intersection traveling control apparatus and includes setting a traveling safety area of a traveling vehicle on a precision map pre-stored in the traveling vehicle, setting a shaded area on the precision map based on data acquired through a sensor mounted on the traveling vehicle, calculating object information moving in a dangerous shaded area and setting an internal area and a virtual stop line corresponding to the object information and the dangerous shaded area, transmitting a slow-down signal and a stop signal along the virtual stop line to the traveling vehicle, and transmitting a dangerous shaded area setting release signal to the traveling vehicle based on the internal area and the object information.

17 Claims, 8 Drawing Sheets

(58) Field of Classification Search
CPC ......... B60W 2520/04; B60W 2555/60; B60W 2556/45; G08G 1/09675; G08G 1/096708; H04W 4/44
See application file for complete search history.

(56) References Cited

U.S. PATENT DOCUMENTS

| | | | | |
|---|---|---|---|---|
| 2020/0004269 | A1* | 1/2020 | Oba | B60W 30/165 |
| 2020/0209873 | A1* | 7/2020 | Chen | G06V 20/58 |
| 2022/0073106 | A1* | 3/2022 | Ahn | B60W 30/18154 |
| 2023/0146119 | A1* | 5/2023 | Chen | G05D 1/024<br>701/27 |

FOREIGN PATENT DOCUMENTS

| | | | | |
|---|---|---|---|---|
| EP | 3582205 | B1 * | 6/2024 | G08G 1/22 |
| JP | 2020190990 | A * | 11/2020 | H04L 67/52 |
| JP | 2024516471 | A * | 4/2024 | G06V 20/588 |
| JP | 7680930 | B2 * | 5/2025 | |
| KR | 20210013443 | A * | 2/2021 | B60W 30/18154 |

OTHER PUBLICATIONS

Pérez, Joshué, et al. "An RFID-based intelligent vehicle speed controller using active traffic signals." Sensors 10.6 (2010): 5872-5887 (Year: 2010).*

Medina-Lee, Juan Felipe, et al. "$ IA (MP)^{2} $: Framework for online motion planning using interaction-aware motion predictions in complex driving situations." IEEE Transactions on Intelligent Vehicles 9.1 (2023): 357-371. (Year: 2023).*

Shahriar, Mohammad Sajid, Arati Kantu Kale, and Kyunghi Chang. "Enhancing intersection traffic safety utilizing V2I communications: Design and evaluation of machine learning based framework." IEEE Access 11 (2023): 106024-106036. (Year: 2023).*

Wang, X., Jiang, C., Sheng, S. and Xu, Y., 2023. Stop-line-aided cooperative positioning for connected vehicles. IEEE Transactions on Intelligent Vehicles, 8(2), pp. 1765-1776. (Year: 2023).*

Shahana, A., and Vedagiri Perumal. "Spatiotemporal variation of traffic conflict at signalized intersections under non-lane-based traffic condition." Transportation research record 2677.1 (2023): 326-340. (Year: 2023).*

* cited by examiner

METHOD FOR CONTROLLING ENTRY OF TRAVELING VEHICLE INTO INTERSECTION ACCORDING TO SHADED AREA SETTING AT NON-TRAFFIC LIGHT INTERSECTION AND APPARATUS THEREOF

CROSS-REFERENCE TO RELATED APPLICATION

This application claims the benefit of Korean Patent Application No. 10-2023-0065519 filed on May 22, 2023, in the Korean Intellectual Property Office, the entire disclosure of which is incorporated herein by reference for all purposes.

TECHNICAL FIELD

The present disclosure relates to a method for controlling entry of a traveling vehicle into an intersection according to shaded area setting in a non-traffic light intersection and an apparatus thereof, and more specifically, a method and an apparatus for controlling a collision of a traveling vehicle that may occur in a non-traffic light intersection by setting a shaded area and setting a virtual stop line according to the shaded area.

BACKGROUND

Worldwide, the capacity of roads in large cities has reached its limit, and traffic congestion has become a routine, resulting in enormous economic losses. It was analyzed that the cost of traffic congestion in Korea's seven major cities was KRW 19 trillion as of 2012, accounting for 63.3% of the total. In order to solve such traffic congestion in large cities, it is necessary to increase capacity through activities such as new construction and expansion of roads, but there is a limit to a short-term solution because huge investment resources are required. Therefore, it is necessary to improve the existing traffic operation and management system to reduce traffic congestion in downtown areas.

Accordingly, as a technology for autonomous traveling is rapidly developing worldwide, discussions on technology development related to controlling a traveling vehicle through the autonomous traveling are being actively conducted. The most important point in autonomous traveling technology is how to control obstacles and uncertainty when traveling and to ensure safe traveling. In this case, discussions on ideas for controlling traveling vehicles through autonomous traveling in areas with higher uncertainty, such as intersections, are becoming active.

Therefore, it will be necessary to discuss a specific method related to the control of a traveling vehicle that travels through autonomous traveling technology in a practical intersection.

The above-mentioned background art is technical information that the inventor possessed for derivation of the present disclosure or obtained in the course of derivation of the present disclosure, and cannot necessarily be said to be a technology known to the general public prior to filing the present disclosure.

SUMMARY

The problem to be solved through the disclosure of the present disclosure is to provide a method and apparatus for preventing a traveling vehicle from colliding with an obstacle by setting a shaded area when a traveling vehicle enters a non-traffic light intersection.

In addition, the problem to be solved through the disclosure of the present disclosure is to provide a method and apparatus capable of controlling the speed of a traveling vehicle by setting a virtual stop line together with the shaded area setting.

In addition, the problem to be solved through the disclosure of the present disclosure is to provide a method and device for a traveling vehicle efficiently to travel at a non-traffic light intersection through a method of setting the virtual stop line according to a speed of the traveling vehicle.

According to an aspect of the present disclosure, there is provided a method performed by an intersection traveling control apparatus to control entry of a traveling vehicle into an intersection according to shaded area setting at a non-traffic light intersection, the method including: setting a traveling safety area of a traveling vehicle on a precision map pre-stored in the traveling vehicle; setting a shaded area on the precision map based on data acquired through a sensor mounted on the traveling vehicle; calculating object information moving in a dangerous shaded area and setting an internal area and a virtual stop line corresponding to the object information and the dangerous shaded area; transmitting a slow-down signal and a stop signal along the virtual stop line to the traveling vehicle; and transmitting a dangerous shaded area setting release signal to the traveling vehicle based on the internal area and the object information.

In the aspect, the calculating of the object information moving in the dangerous shaded area and the setting of the internal area and the virtual stop line corresponding to the object information and the dangerous shaded area may further include detecting an object moving from the dangerous shaded area to a travelable area.

In the aspect, the calculating of the object information moving in the dangerous shaded area and the setting of the internal area and the virtual stop line corresponding to the object information and the dangerous shaded area may further include calculating object information based on the detected object.

In the aspect, the calculating of the object information moving in the dangerous shaded area and the setting of the internal area and the virtual stop line corresponding to the object information and the dangerous shaded area may further include setting the internal area and the virtual stop line based on object speed information of the object information.

In the aspect, the transmitting of the slow-down signal and the stop signal along the virtual stop line to the traveling vehicle may further include an operation for setting a time point for transmitting a dangerous shaded area release signal based on object speed information of the object information.

In the aspect, the transmitting of the slow-down signal and the stop signal along the virtual stop line to the traveling vehicle further includes an operation for redetecting whether or not there is the object moving in the dangerous shaded area.

In the aspect, the transmitting of the slow-down signal and the stop signal along the virtual stop line to the traveling vehicle may further include transmitting the dangerous shaded area setting release signal based on a shaded area release signal transmission time point and re-detection of whether the object exists.

In the aspect, the virtual stop line may be closer to the traveling vehicle than an edge line reference of the internal area.

According to the solving means of the present disclosure described above, when the traveling vehicle enters the non-traffic light intersection, it is possible to provide a method and apparatus for preventing the traveling vehicle from colliding with an obstacle by setting the shaded area.

In addition, according to the solving means of the present disclosure, it is possible to provide a method and apparatus capable of controlling the speed of the traveling vehicle by setting the virtual stop line together with the shaded area setting.

In addition, according to the solving means of the present disclosure, a method and apparatus for efficiently traveling the traveling vehicle at the non-traffic light intersection can be provided through the method of setting the virtual stop line according to the speed of the traveling vehicle.

DETAILED DESCRIPTION

Figure 1:
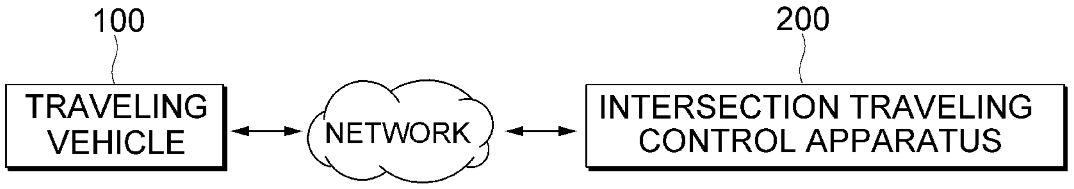
FIG. 1 illustrates an exemplary environment to which an intersection traveling control apparatus according to some embodiments of the present disclosure may be applied.

Hereinafter, preferred embodiments of the present disclosure will be described in detail with reference to the accompanying drawings. Advantages and features of the present disclosure, and methods of achieving them, will become clear with reference to the embodiments described below in detail in conjunction with the accompanying drawings. However, the technical idea of the present disclosure is not limited to the following embodiments and can be implemented in various different forms. That is, the following embodiments are merely provided to complete the technical spirit of the present disclosure and to completely inform those skilled in the art of the scope of the present disclosure, and the technical spirit of the present disclosure is only defined by the scope of the claims.

In adding reference numerals to components of each drawing, it should be noted that the same components have the same numerals as much as possible even when they are displayed on different drawings. In addition, in describing the present disclosure, when it is determined that a detailed description of a related known configuration or function may obscure the gist of the present disclosure, the detailed description will be omitted.

Unless otherwise defined, all terms (including technical and scientific terms) used in this specification may be used with meanings commonly understood by those of ordinary skill in the art to which this disclosure belongs. In addition, terms defined in commonly used dictionaries are not interpreted ideally or excessively unless explicitly specifically defined. Terminology used herein is for describing the embodiments and is not intended to limit the present disclosure. In this specification, the singular also includes the plural unless specifically stated in the phrase.

Moreover, terms such as first, second, A, B, (a), and (b) may be used in describing the components of the present disclosure. These terms are only used to distinguish the component from other components, and the nature, order, or order of the corresponding component is not limited by the term. When a component is described as being "connected," "coupled," or "joined" to another component, it should be understood that the component may be directly connected or joined to the other component, but that still another component may be "connected", "coupled," or "joined" between the components.

As used herein, "comprises" and/or "comprising" means that a stated component, step, operation, and/or element do not preclude the presence or addition of one or more other components, steps, operations, and/or elements.

Hereinafter, various embodiments of the present disclosure will be described in detail with reference to the accompanying drawings.

In addition, in describing the components of the present disclosure, terms such as first, second, A, B, (a), and (b) may be used. These terms are only used to distinguish the component from other components, and the nature, order, or order of the corresponding component is not limited by the term. Throughout the specification, when a part "includes" or "has" a certain component, it means that it may further include other components without excluding other components unless otherwise stated. Moreover, terms such as "unit" and "module" described in the specification refer to a unit that processes at least one function or operation, and may be implemented by hardware, software, or a combination of hardware and software.

FIG. 1 illustrates an exemplary environment to which an intersection traveling control apparatus according to some embodiments of the present disclosure may be applied. When a traveling vehicle 100 travels at an intersection through a system including the traveling vehicle 100 and an intersection traveling control apparatus 200 illustrated in FIG. 1, the system detects surrounding vehicles and controls the traveling vehicle 100 so that the traveling vehicle smoothly travels at the intersection.

Hereinafter, operations of components illustrated in FIG. 1 related to intersection traveling of the traveling vehicle through the above-described system will be described in more detail.

FIG. 1 illustrates an example in which the traveling vehicle 100 and the intersection traveling control apparatus 200 are connected through a network, but this is only for convenience of understanding, and the number of devices that can be connected to the network may be changed.

Meanwhile, FIG. 1 only illustrates a preferred embodiment for achieving the object of the present disclosure, and some components may be added or deleted as necessary. Hereinafter, the components illustrated in FIG. 1 will be described in more detail.

The intersection traveling control apparatus 200 can detect a traveling direction of the traveling vehicle 100, retrieve information of the traveling vehicle 100, and control traveling at an intersection. Here, the intersection traveling control apparatus 200 may collect and analyze various information generated from the traveling vehicle 100.

Various information may include all data generated by the traveling vehicle 100, and may include, for example, a speed of the traveling vehicle, a wheel angle of a steering device, and specifications of the traveling vehicle itself, or the like, and further include information about the environment in which the traveling vehicle travels. This information may be information collected by utilizing a series of devices in the traveling vehicle 100 while the traveling vehicle 100 is traveling, and it is natural that the series of devices may include all electronic devices of the traveling vehicle 100 from the point of view of a person skilled in the art. In addition, this information may include information collected when the vehicle stops rather than traveling.

The traveling vehicle 100 illustrated in FIG. 1 may include vehicles equipped with autonomous traveling technology as well as vehicles not equipped with general autonomous traveling technology. The traveling vehicle 100 may include both a four-wheeled vehicle and a two-wheeled motorcycle.

In order to exclude redundant descriptions, various operations performed by the intersection traveling control apparatus 200 will be described in more detail later with reference to the drawings below in FIG. 2.

Meanwhile, the intersection traveling control apparatus 200 may be implemented with one or more computing devices. For example, all functions of the intersection traveling control apparatus 200 may be implemented in a single computing device. As another example, the first function of the intersection traveling control apparatus 200 may be implemented in a first computing device, and the second function may be implemented in a second computing device. Here, the computing device may be a notebook, a desktop, or a laptop, but is not limited thereto and may include any type of device equipped with a computing function. However, it may be desirable to implement the intersection traveling control apparatus 200 as a high-performance server-class computing device. An example of the computing device will be described with reference to FIG. 8.

In addition, functions that can additionally be implemented in the intersection traveling control apparatus 200 may be implemented using electronic devices mounted on the traveling vehicle 100. Therefore, in FIG. 1, the intersection traveling control apparatus 200 and the traveling vehicle 100 are illustrated separately, but according to one embodiment, it is natural that the intersection traveling control apparatus 200 is mounted on the traveling vehicle 100 so that the intersection traveling control apparatus 200 can implement the first function and the second function within the traveling vehicle 100. Therefore, as illustrated in FIG. 1, it should be noted that the preset disclosure is not limited to an embodiment in which the traveling vehicle 100 and the intersection traveling control apparatus 200 are externally separated.

In the present specification, for convenience of description, a situation in which the traveling vehicle 100 and the intersection traveling control apparatus 200 are separated to implement functions will be described.

In some embodiments, components included in an environment to which the intersection traveling control apparatus 200 is applied may communicate through a network. The network may be implemented as all types of wired/wireless networks such as a Local Area Network (LAN), a Wide Area Network (WAN), a mobile radio communication network, and Wibro (Wireless Broadband Internet).

Meanwhile, the environment illustrated in FIG. 1 illustrates that the traveling vehicle 100 and the intersection traveling control apparatus 200 are connected through a network, but the scope of the present disclosure is not limited thereto, and it should be noted that the traveling vehicle 100 may be connected to the intersection traveling control apparatus 200 through a Peer to Peer (P2P) network.

Hereinbefore, with reference to FIG. 1, an exemplary environment to which the intersection traveling control apparatus 200 according to some embodiments of the present disclosure can be applied has been described. Hereinafter, methods according to various embodiments of the present disclosure will be described in detail with reference to the drawings below in FIG. 2.

Each step of the methods described below may be performed by a computing device. In other words, each step of the methods may be implemented as one or more instructions executed by a processor of a computing device. All of the steps involved in these methods could be performed by one physical computing device, but first steps of the method may be performed by a first computing device and second steps of the method may be performed by a second computing device.

Hereinafter, in FIG. 2, description will be continued on the assumption that each step of the methods is performed by the intersection traveling control apparatus 200 illustrated in FIG. 1. However, for convenience of description, the description of the subject of operation of each step included in the methods may be omitted.

Figure 2:
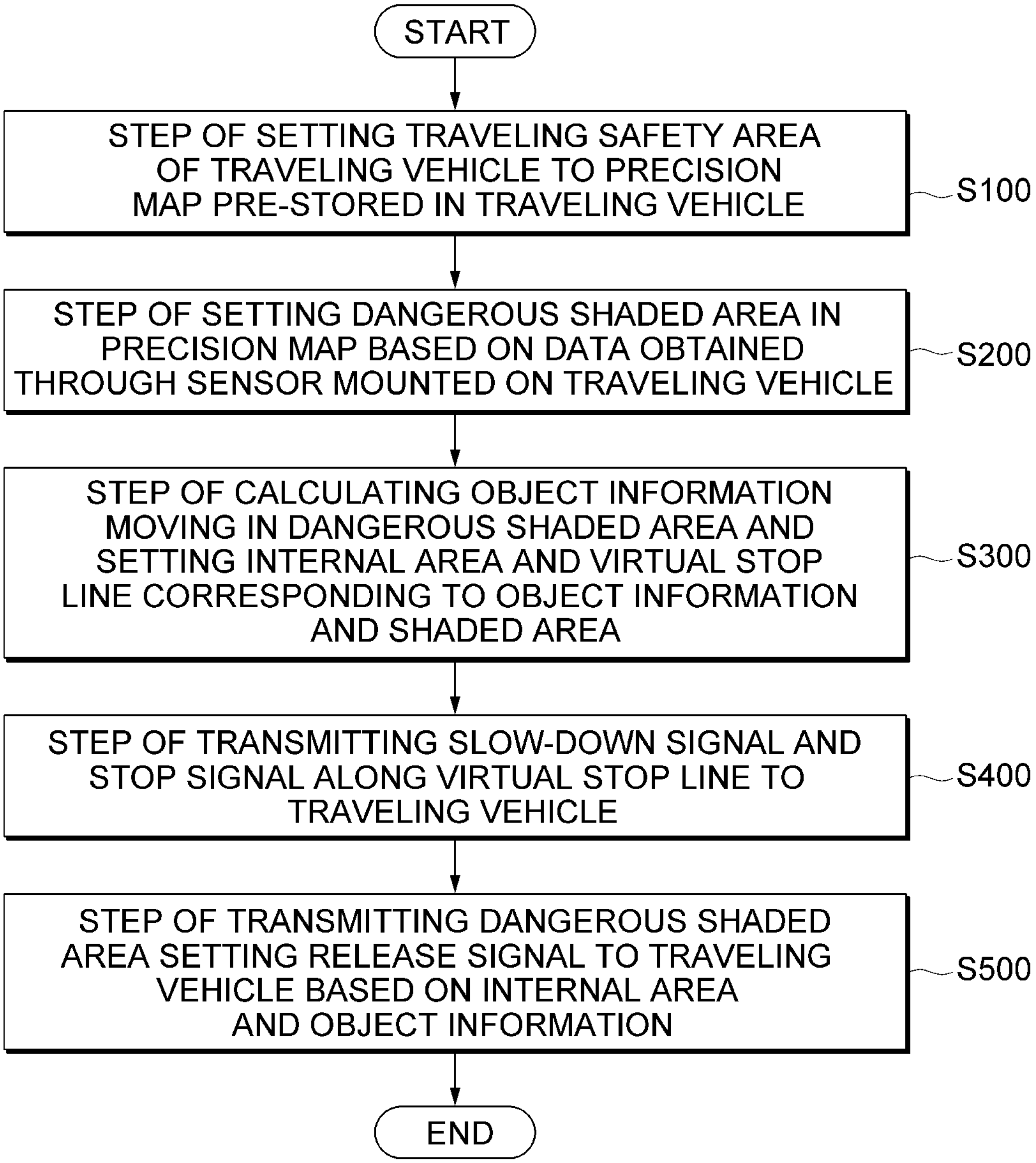
FIG. 2 is a flowchart of a method for controlling a traveling vehicle in a non-traffic light intersection that may be performed in an intersection traveling control apparatus according to some embodiments of the present disclosure.

FIG. 2 is a flowchart of a method for controlling the traveling vehicle in the non-traffic light intersection that may be performed in the intersection traveling control apparatus according to some embodiments of the present disclosure.

In Step S100, the intersection traveling control apparatus 200 may set a traveling safety area of the traveling vehicle 100 to a precision map pre-stored in the traveling vehicle 100. The precision map means a precision map related to an area in which the traveling vehicle 100 travels. Accordingly, the precision map refers to a map of a space in which the traveling vehicle 100 travels, and the precision map may include information about obstacles, roads, sidewalks, and traffic lights around the traveling vehicle 100.

The intersection traveling control apparatus 200 may set the traveling safety area of the traveling vehicle 100 with respect to the precision map. More specifically, the intersection traveling control apparatus 200 may utilize a sensor mounted on the traveling vehicle 100 to set an area in which the traveling vehicle 100 can travel. For example, the intersection traveling control apparatus 200 may set an area corresponding to a road on which the traveling vehicle 100 can travel on a precision map as a travelable area, and an area with sidewalks or obstacles may be set as an untravellable area. Setting the travelable area in the intersection traveling control apparatus 200 may be set by the intersection traveling control apparatus 200 in real time while the traveling vehicle 100 dynamically travels.

In addition, the sensor mounted on the traveling vehicle 100 described above in the present disclosure may include both a camera sensor or a 2D and 3D lidar sensor. In addition, the precision map may be map data generated according to sensor data acquired in real time while the traveling vehicle 100 is traveling. Accordingly, the precision map may be pre-generated and stored, but may also be map data generated by processing data acquired through the sensor mounted on the traveling vehicle 100 while the traveling vehicle 100 is traveling.

In Step S200, the intersection traveling control apparatus 200 may set a dangerous shaded area in the precision map based on the data obtained through the sensor mounted on the traveling vehicle 100.

The intersection traveling control apparatus 200 may set the shaded area for the precision map corresponding to traveling of the traveling vehicle 100. In this case, as for the area set as the shaded area in the intersection traveling control apparatus 200, an unsensed area covered by an obstacle in the sensor mounted on the traveling vehicle 100 may be set as the shaded area. In this case, the obstacle may include a building, a tree, a person, a traveling vehicle, a stationary vehicle, and the like. The shaded area is obtained while the traveling vehicle 100 is traveling, and means an area that is identified in the precision map by comparing the data acquired through the sensor mounted on the traveling vehicle 100 with the pre-stored precision map, but not identified through the data acquired in the traveling vehicle 100.

A specific example of the shaded area will be described later with reference to FIGS. 5 to 7. Furthermore, the shaded area can be set dynamically while the traveling vehicle 100 is traveling, and thus, the shaded area set according to data acquired while the traveling vehicle 100 is traveling can be set while changing in real time.

In Step S300, the intersection traveling control apparatus 200 may calculate object information moving in the dangerous shaded area, and set an internal area and a virtual stop line corresponding to the object information and the shaded area. The intersection traveling control apparatus 200 may set the virtual stop line corresponding to the shaded area set in Step S200. The intersection traveling control apparatus 200 may set a virtual stop line at a location spaced apart from the front of the traveling vehicle 100 by a first threshold distance. The virtual stop line means a stop line for the traveling vehicle 100 to slow down or stop, and the intersection traveling control apparatus 200 may control the traveling vehicle 100 so that the traveling vehicle 100 does not travel beyond the virtual stop line.

Moreover, the intersection traveling control apparatus 200 may calculate the object information moving in the dangerous shaded area. As for the object information, the shaded area is set in real time while the traveling vehicle 100 is traveling, and the object information moving in the shaded area can be calculated.

Alternatively, the object information calculated by the intersection traveling control apparatus 200 may include information of a moving person. For example, when a crosswalk is included in the set shaded area, the average number of people moving on the crosswalk during an average period in the set shaded area may be calculated, and the number of people moving on the crosswalk during a certain period may be calculated as the object information.

In this case, the intersection traveling control apparatus 200 may set the virtual stop line based on the object information. For example, when the virtual stop line is set based on the object information, the intersection traveling control apparatus 200 may set the virtual stop line by adjusting a first threshold distance ahead. For example, the virtual stop line may be set by setting the front first threshold distance to be shorter as the average number of vehicles moving in the traveling vehicle direction and the number of people moving on the crosswalk of the object information are larger. Therefore, the intersection traveling control apparatus 200 may set the front first threshold distance for establishing the virtual stop line by considering the average number of moving vehicles in the traveling vehicle direction, the average number of vehicles moving in the direction opposite to the traveling vehicle direction, and the average number of people moving on the crosswalk of the object information.

In this case, the intersection traveling control apparatus 200 may set a weight value for the average number of people moving on the crosswalk as a more important decision parameter. For example, with respect to the average number of vehicles moving in the traveling vehicle direction, the average number of vehicles moving in the direction opposite to the traveling vehicle direction, and the average number of people moving on the crosswalk, a first weight set for the average number of vehicles moving in the traveling vehicle direction is set to 1, a second weight set for the average number of vehicles moving in the direction opposite to the traveling vehicle direction is set to 2, a third weight set for the average number of people moving on the crosswalk is set to 10, and the virtual stop line may be set by setting the front first threshold distance based on a number calculated by multiplying each average number and each weight. The specific values of the first, second, and third weights described above in the above example correspond to only one example, and may be changed to other values, of course.

Hereinafter, the setting of the virtual stop line and another embodiment related to the object information will be described with reference to FIG. 3.

Figure 3:
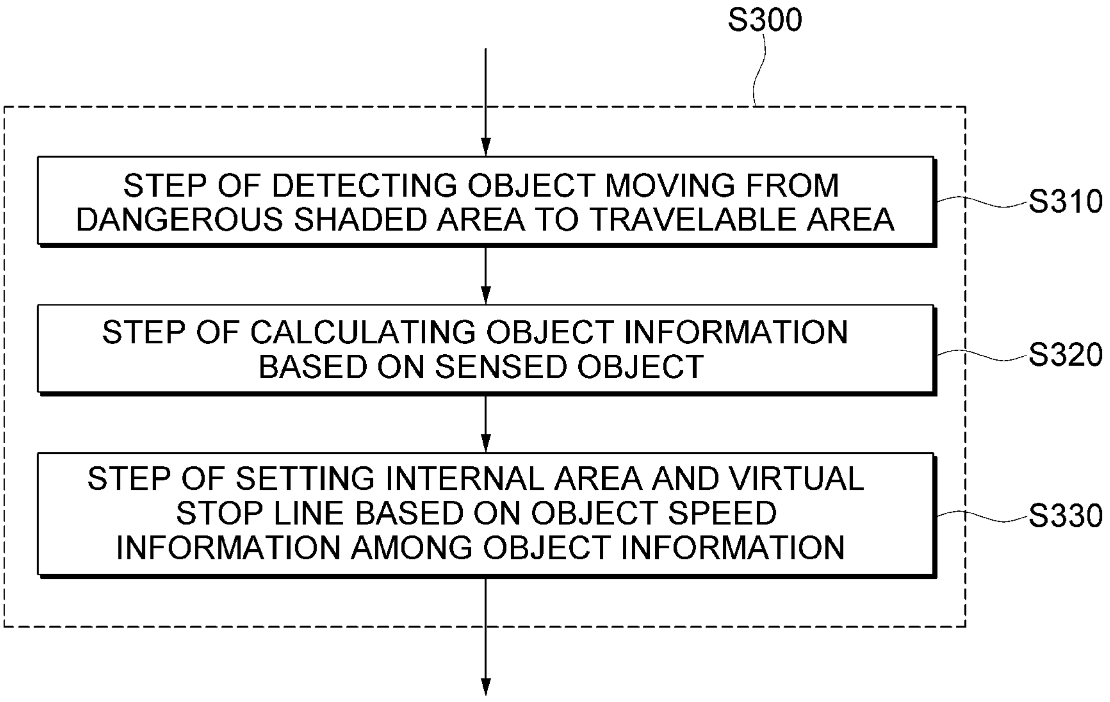
FIG. 3 is a flowchart for specifically explaining a step of setting an internal area and a virtual stop line corresponding to object information and a shaded area according to some embodiments of the present disclosure.

FIG. 3 is a flowchart for a detailed description of a step of setting the internal area and the virtual stop line corresponding to the object information and the shaded area according to some embodiments of the present disclosure.

In Step S310, the intersection traveling control apparatus 200 may detect an object moving from the dangerous shaded area to a travelable area.

The object information may be information calculated based on the precision map pre-stored in the intersection traveling control apparatus 200 through the number of objects moving on average during a preset period in the set shaded area. For example, the average number of moving vehicles per hour, 30 minutes, or 10 minutes may be calculated as the object information based on the average number of moving vehicles per day in the set shaded area. In this case, the intersection traveling control apparatus 200 may calculate the object information by considering the traveling direction of the object (vehicle) moving in the area set as the dangerous shaded area.

As another example, in consideration of the traveling direction set by the traveling vehicle 100, the intersection traveling control apparatus 200 may detect an object moving from the shaded area to the travelable area. For example, in the intersection traveling control apparatus 200, the shaded area is dynamically set while the traveling vehicle 100 is dynamically traveling, and accordingly, the travelable area may be set to an area other than the shaded area. In this case, the object moving to the travelable area can be dynamically detected. The dynamic object, which is the moving object, can detect the object by analyzing data acquired through a sensor mounted on the traveling vehicle 100.

In Step S320, the intersection traveling control apparatus 200 may calculate the object information based on the sensed object. The intersection traveling control apparatus 200 may detect the object moving to the aforementioned travelable area in Step S310 and calculate the object information for the object. For example, the object information may calculate information about the type, direction, speed, or the like of the object.

In Step S330, the intersection traveling control apparatus 200 may set the internal area and the virtual stop line based on object speed information among object information. The intersection traveling control apparatus 200 may set the internal area and the virtual stop line among travelable areas based on the speed information of the object of the object information calculated in Step S320. For example, in the intersection traveling control apparatus 200, when the speed of an object of the object information exceeds a predetermined threshold speed, while the traveling vehicle 100 is traveling on the virtual stop line, the virtual stop line may be set at a distance separated from the front second threshold distance, and the internal area corresponds to the virtual stop line and may mean a part of the travelable area.

The virtual stop line set in the intersection traveling control apparatus 200 may be characterized as being closer to the traveling vehicle than the edge line reference of the aforementioned internal area. More specifically, the virtual stop line set by the intersection traveling control apparatus 200 is set closer to the traveling vehicle 100 than the edge line of the area set as the internal area in the precision map, and thus, it is possible to prevent the traveling vehicle 100 from traveling in the internal area, and it is possible to prevent a collision that may occur while the traveling vehicle 100 is traveling.

Returning to FIG. 2 again, in Step S400, the intersection traveling control apparatus 200 may transmit the slow-down signal and the stop signal of the traveling vehicle 100 to the traveling vehicle 100 based on the virtual stop line. A detailed description of this will be detailed in FIG. 4.

Figure 4:
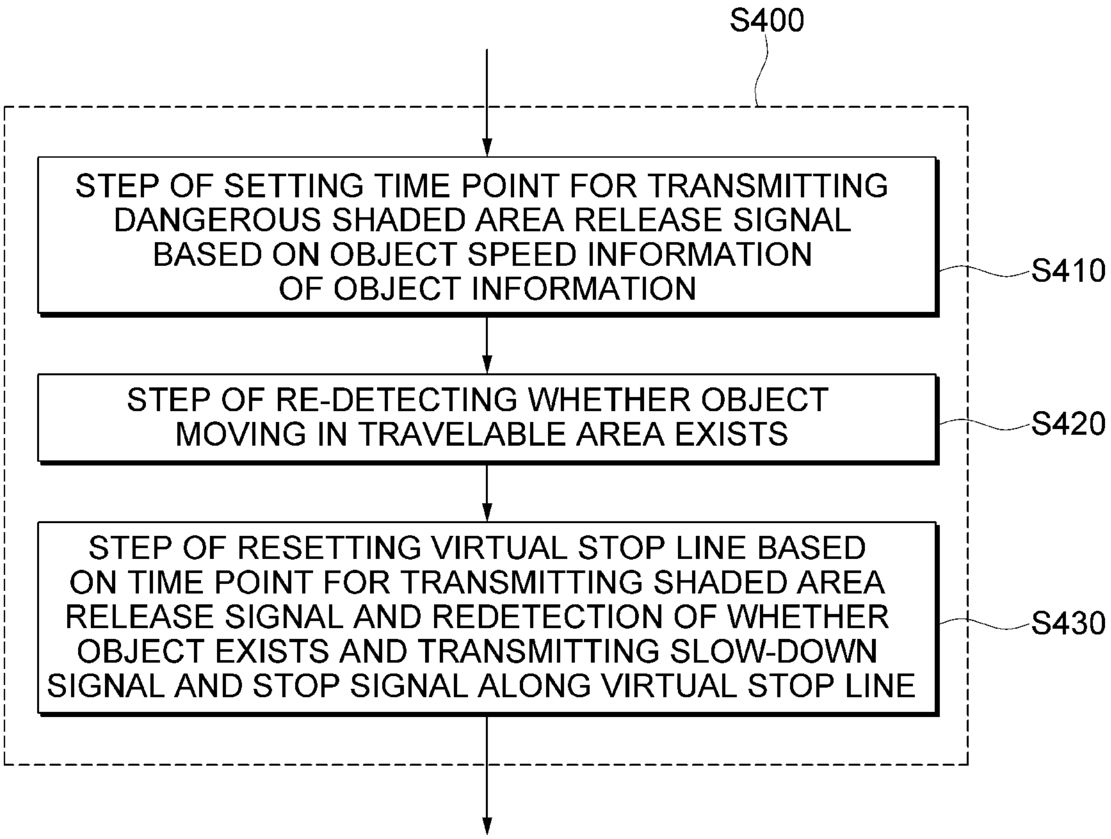
FIG. 4 is a flowchart for specifically explaining a step of transmitting a slow-down signal and a stop signal along a virtual stop line to a traveling vehicle according to some embodiments of the present disclosure.

FIG. 4 is a flowchart for specifically explaining a step of transmitting the slow-down signal and the stop signal to the traveling vehicle according to the virtual stop line according to some embodiments of the present disclosure.

In Step S410, the intersection traveling control apparatus 200 may set a time point for transmitting a dangerous shaded area release signal based on the object speed information of the object information. The intersection traveling control apparatus 200 may transmit the slow-down signal and the stop signal so that the traveling vehicle 100 does not travel beyond the set virtual stop line.

In addition, the intersection traveling control apparatus 200 may transmit the slow-down signal and the stop signal to the traveling vehicle 100 based on the object speed information of the object information described in FIGS. 2 and 3. For example, when the object speed information exceeds a threshold speed, an immediate stop signal may be transmitted to the traveling vehicle 100, and when the object speed information does not exceed the threshold speed, the slow-down signal may be transmitted to the traveling vehicle.

Also, the intersection traveling control apparatus 200 may set the timepoint for transmitting the slow-down signal and the stop signal based on the object speed information of the object information. For example, when the object speed of the object information exceeds the threshold speed, the stop signal is transmitted based on a first transmission time point, and when the object speed of the object information does not exceed the threshold speed, the stop signal is transmitted based on a second transmission time point. Here, the second transmission time point may be longer than the first transmission time point.

In addition, the intersection traveling control apparatus 200 may set a time point for transmitting the dangerous shaded area release signal based on the object speed information of the object information. For example, after the traveling vehicle 100 slows down and stops according to a virtual stop line, the dangerous shaded area release signal for the traveling vehicle 100 to travel again may be transmitted, and the shaded area release signal transmission time point may also be set. More specifically, according to the intersection traveling control apparatus 200, the traveling vehicle 100 may receive the slow-down signal and the stop signal along the virtual stop line, and when the object speed information is equal to or less than the threshold speed, the traveling vehicle 100 may receive the dangerous shaded area release signal. The dangerous shaded area release signal may set all areas in which the dangerous shaded area is set as the travelable areas, and control traveling of the traveling vehicle 100.

In this case, in the dangerous shaded area release signal transmitted from the intersection traveling control apparatus 200, the slower the object speed, the longer the time interval between the time point of transmitting the release signal and the time point of transmitting the slow-down signal and the stop signal along the virtual stop line. Therefore, when the object speed is less than a second threshold speed, which is lower than the above-mentioned threshold speed, the time point for transmitting the dangerous shaded area release signal is set later to prevent collision with the traveling vehicle 100.

In Step S420, the intersection traveling control apparatus 200 may re-detect whether the object moving in the travelable area exists. After transmitting the dangerous shadow release signal, the intersection traveling control apparatus 200 may redetect an object located in the travelable area while the traveling vehicle 100 is traveling in the travelable area. The re-detection may be a process of detecting whether the object is located in the travelable area by analyzing acquired data using the sensor mounted on the traveling vehicle 100.

In Step S430, the intersection traveling control apparatus 200 may reset the virtual stop line and transmit the slow-down signal and the stop signal to the traveling vehicle 100. In Step S420, when the intersection traveling control apparatus 200 detects the object based on the sensor data acquired by the traveling vehicle 100, the intersection traveling control apparatus 200 may reset the virtual stop line at a location spaced apart from the traveling vehicle 100 by the front threshold distance, and transmit the slow-down signal and the stop signal corresponding to the virtual stop line to the traveling vehicle 100. Through this, the intersection traveling control apparatus 200 can prevent collision between the traveling vehicle 100 and the object by resetting the virtual stop line when the traveling vehicle 100 detects the object in the travelable area.

Returning to FIG. 2 again, in Step S500, the intersection traveling control apparatus 200 may transmit the dangerous shaded area setting release signal to the traveling vehicle 100 based on the internal area and the object information. After the intersection traveling control apparatus 200 resets the virtual stop line, the intersection traveling control apparatus may transmit the slow-down signal and the stop signal to the traveling vehicle 100, and then, transmit the shaded area release setting signal to the traveling vehicle 100 to control the traveling of the traveling vehicle 100. The shaded area release setting signal may include a signal to release the virtual stop line set in the traveling vehicle 100 and may include a normal traveling signal of the traveling vehicle 100.

Hereinafter, exemplary situations according to the present disclosure will be described in detail with reference to FIGS. 5 to 7.

Figure 5:
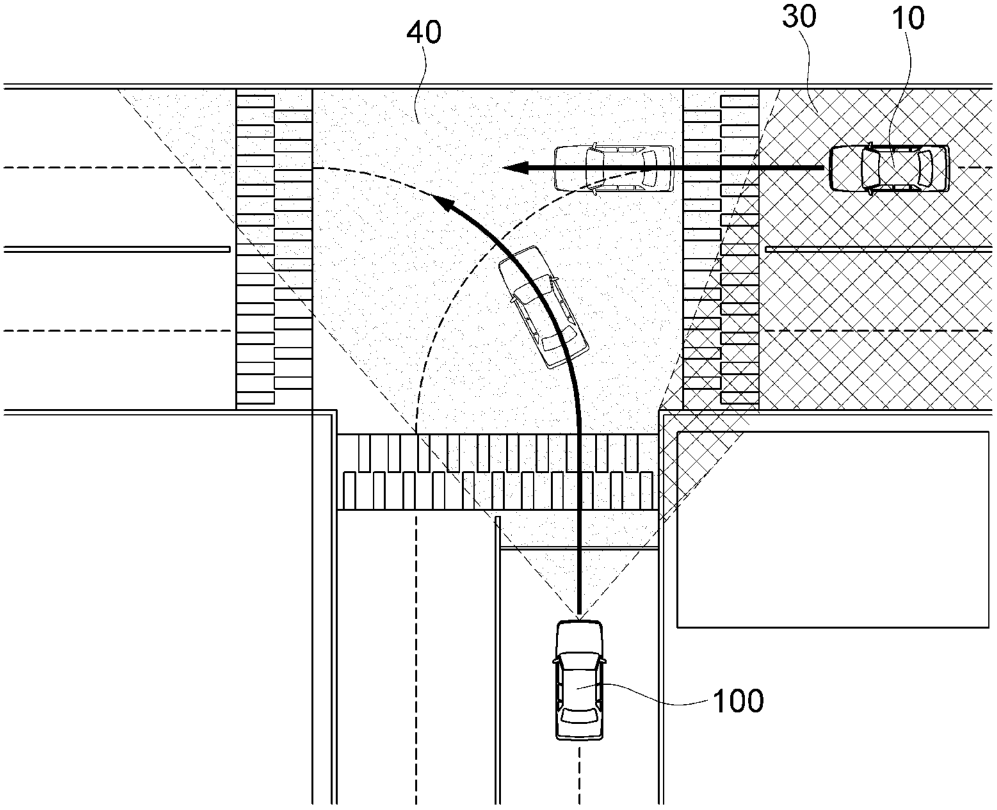
FIGS. 5 to 7 are exemplary diagrams for explaining a method of controlling the traveling vehicle through the shaded area and the virtual stop line according to some embodiments of the present disclosure.
Figure 6:
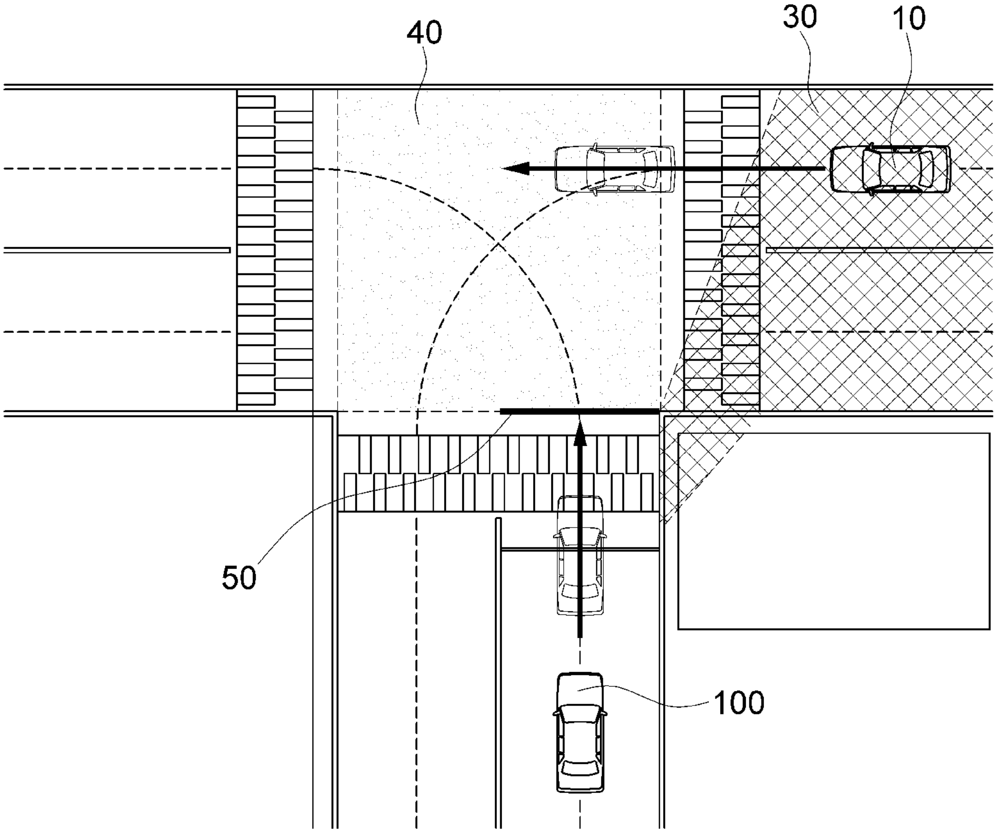
Figure 7:
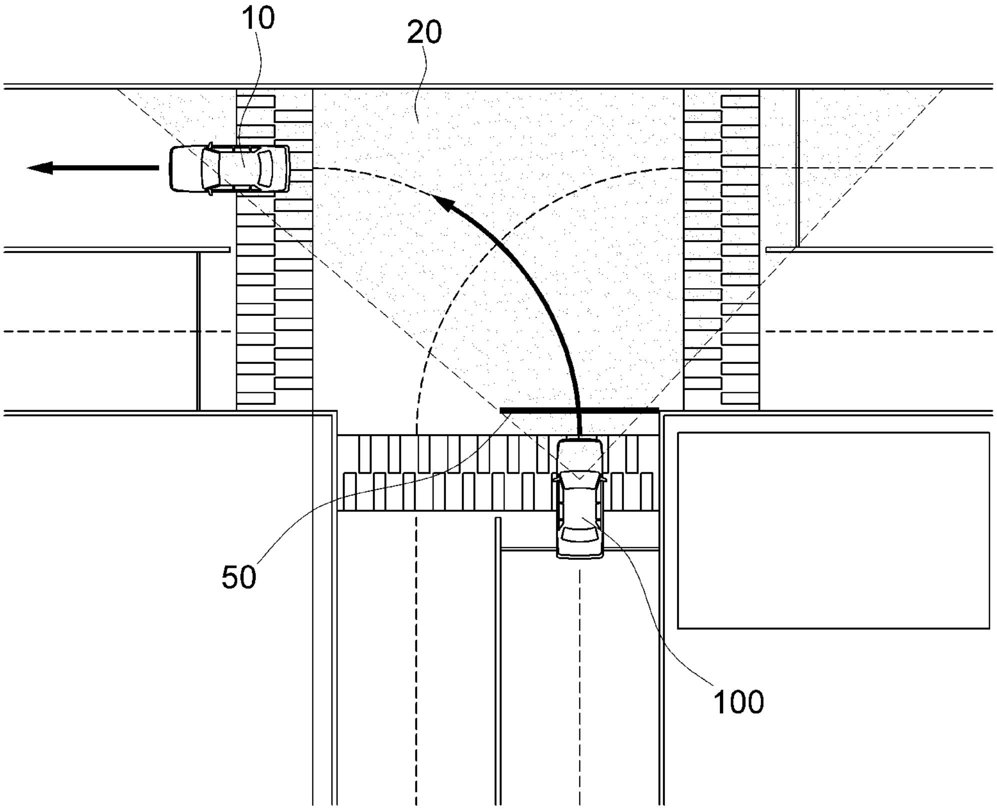

FIGS. 5 to 7 are exemplary diagrams for explaining a method of controlling the traveling vehicle through the shaded area and the virtual stop line according to some embodiments of the present disclosure.

The drawings illustrated in FIGS. 5 to 7 exemplify the precision map described in detail in the present disclosure.

The intersection traveling control apparatus 200 may set a travelable area 40 in which the traveling vehicle 100 can travel in a precision map, and set a shaded area 30 in the precision map. Since the detailed description of setting the shaded area 30 has been described above with reference to FIGS. 2 to 4, it will be omitted.

The intersection traveling control apparatus 200 may detect an object 10 located in the dangerous shaded area 30 in a precision map and calculate the object information. The object 10 may be dynamically detected through a sensor mounted on the traveling vehicle 100. Therefore, in the intersection traveling control apparatus 200, while the traveling vehicle 100 is traveling, the dangerous shaded area 30 is dynamically changed and set, and accordingly, the travelable area 40 can also be set while dynamically changing. In this case, the intersection traveling control apparatus 200 may detect the object 10 moving to the travelable area 40.

At this time, the intersection traveling control apparatus 200 may set a virtual stop line 50, and the intersection traveling control apparatus 200 may set an internal area 20 according to the virtual stop line. The internal area 20 may be an area excluding the virtual stop line or an area including the virtual stop line.

Hereinafter, a system to which an embodiment of the present disclosure can be applied will be described using FIG. 8.

Figure 8:
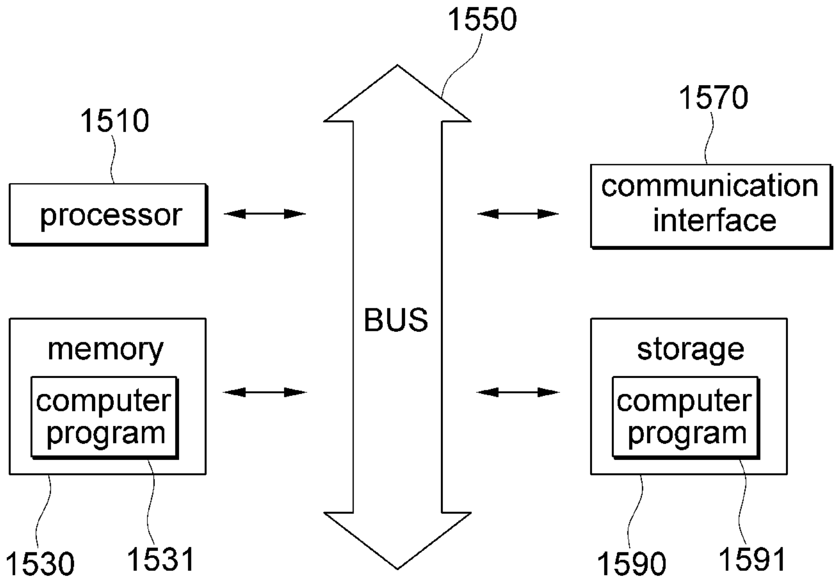
FIG. 8 is a diagram of an exemplary computing device in which devices and/or systems in accordance with various embodiments of the present disclosure may be implemented.

FIG. 8 is a diagram of an exemplary computing device in which devices and/or systems in accordance with various embodiments of the present disclosure may be implemented.

A computing device 1500 may include one or more processors 1510, a bus 1550, a communication interface 1570, a memory 1530 for loading a computer program 1591 executed by the processor 1510, and a storage 1590 for storing a computer program 1591. However, only components related to the embodiment of the present disclosure are illustrated in FIG. 8. Accordingly, those skilled in the art to which the present disclosure pertains can know that other general-purpose components may be further included in addition to the components illustrated in FIG. 8.

The processor 1510 controls the overall operation of each component of the computing device 1500. The processor 1510 may include a Central Processing Unit (CPU), a Micro Processor Unit (MPU), a Micro Controller Unit (MCU), a Graphic Processing Unit (GPU), or any type of processor well known in the art of the present disclosure. Moreover, the processor 1510 may perform an operation for at least one application or program for executing a method according to embodiments of the present disclosure. The computing device 1500 may include one or more processors.

The memory 1530 stores various data, commands and/or information. The memory 1530 may load one or more programs 1591 from the storage 1590 to execute a method according to embodiments of the present disclosure. The memory 1530 may be implemented as a volatile memory such as RAM, but the technical scope of the present disclosure is not limited thereto.

The bus 1550 provides a communication function between components of the computing device 1500. The bus 1550 may be implemented as various types of buses such as an address bus, a data bus, and a control bus.

The communication interface 1570 supports wired and wireless Internet communication of the computing device 1500. Moreover, the communication interface 1570 may support various communication methods other than Internet communication. To this end, the communication interface 1570 may include a communication module well known in the art of the present disclosure.

According to some embodiments, the communication interface 1570 may be omitted.

The storage 1590 may non-temporarily store the one or more programs 1591 and various data.

The storage 1590 may include non-volatile memory such as read only memory (ROM), erasable programmable ROM (EPROM), electrically erasable programmable ROM (EEPROM), flash memory, or the like, a hard disk, a removable disk, or any form of computer-readable recording medium well known in the art to which the present disclosure pertains.

The computer program 1591 may include one or more instructions that, when loaded into the memory 1530, cause the processor 1510 to perform methods/operations according to various embodiments of the present disclosure. That is, the processor 1510 may perform methods/operations according to various embodiments of the present disclosure by executing the one or more instructions.

So far, various embodiments of the present disclosure and effects according to the embodiments have been described with reference to FIGS. 1 to 8. Effects according to the technical idea of the present disclosure are not limited to the effects mentioned above, and other effects not mentioned will be clearly understood by those skilled in the art from the description of the specification.

The technical idea of the present disclosure described with reference to FIGS. 1 to 8 so far may be implemented as computer readable code on a computer readable medium. The computer-readable recording medium may be, for example, a removable recording medium (CD, DVD, Blu-ray disc, USB storage device, removable hard disk) or a fixed recording medium (ROM, RAM, computer-equipped hard disk). The computer program recorded on the computer-readable recording medium may be transmitted to another computing device through a network such as the Internet, installed in the other computing device, and thus used in the other computing device.

In the above, even though all the components constituting the embodiments of the present disclosure have been described as being combined or operated as one, the technical idea of the present disclosure is not necessarily limited to these embodiments. That is, within the scope of the purpose of the present disclosure, all of the components may be selectively combined with one or more to operate.

Although actions are illustrated in a particular order in the drawings, it should not be understood that the actions must be performed in the specific order illustrated or in a sequential order, or that all illustrated actions must be performed to obtain a desired result. In certain circumstances, multitasking and parallel processing may be advantageous. Moreover, the separation of the various components in the embodiments described above should not be understood as requiring such separation, and it should be understood that the described program components and systems may generally be integrated together into a single software product or packaged into multiple software products.

Although the embodiments of the present disclosure have been described with reference to the accompanying drawings, those skilled in the art to which the present disclosure pertains can understand that the present disclosure may be implemented in other specific forms without changing the technical spirit or essential characteristics thereof. Therefore, the embodiments described above should be understood as illustrative in all respects and not limiting. The protection scope of the present disclosure should be construed by the following claims, and all technical ideas within the equivalent range should be construed as being included in the scope of rights of the technical ideas defined by the present disclosure.

What is claimed is:

1. An intersection traveling control apparatus comprising:
a processor;
a network interface;
a memory; and
a computer program loaded into the memory and executed by the processor,
wherein the processor includes
an instruction for setting a traveling safety area of a traveling vehicle on a precision map pre-stored in the traveling vehicle,
an instruction for setting a shaded area on the precision map based on data acquired through a sensor mounted on the traveling vehicle,
an instruction for obtaining object information moving in a dangerous shaded area based on the data acquired through the sensor and setting an internal area and a virtual stop line corresponding to the object information and the dangerous shaded area,
an instruction for transmitting a slow-down signal and a stop signal along the virtual stop line to the traveling vehicle, and
an instruction for transmitting a dangerous shaded area setting release signal to the traveling vehicle based on the internal area and the object information,
wherein the virtual stop line indicates a position that is different from a position indicated by an actual stop line drawn on a road, and
wherein the instruction for obtaining the object information moving in the dangerous shaded area and setting the internal area and the virtual stop line corresponding to the object information and the dangerous shaded area further includes an instruction for detecting an object moving from the dangerous shaded area to a travelable area.

2. A system for controlling entry of a traveling vehicle into an intersection, the system comprising:
a traveling vehicle; and
an intersection traveling control apparatus configured to set a traveling safety area of the traveling vehicle on a precision map pre-stored in the traveling vehicle, set a shaded area on the precision map based on data acquired through a sensor mounted on the traveling vehicle, obtain object information moving in a dangerous shaded area based on the data acquired through the sensor and set an internal area and a virtual stop line corresponding to the object information and the dangerous shaded area, transmit a slow-down signal and a stop signal along the virtual stop line to the traveling vehicle, and transmit a dangerous shaded area setting release signal to the traveling vehicle based on the internal area and the object information,
wherein the virtual stop line indicates a position that is different from a position indicated by an actual stop line drawn on a road, and
wherein in the intersection traveling control apparatus, the operation for obtaining the object information moving in the dangerous shaded area and setting the internal area and the virtual stop line corresponding to the object information and the dangerous shaded area further includes an operation for detecting an object moving from the dangerous shaded area to a travelable area.

3. The intersection traveling control apparatus of claim 1, wherein the instruction for obtaining the object information moving in the dangerous shaded area and setting the internal area and the virtual stop line corresponding to the object information and the dangerous shaded area further includes an instruction for obtaining object information based on the detected object.

4. The intersection traveling control apparatus of claim 3, wherein the instruction for obtaining the object information moving in the dangerous shaded area and setting the internal area and the virtual stop line corresponding to the object information and the dangerous shaded area further includes an instruction for setting the internal area and the virtual stop line based on object speed information of the object information.

5. The intersection traveling control apparatus of claim 4, wherein the instruction for transmitting the slow-down signal and the stop signal along the virtual stop line to the traveling vehicle further includes an instruction for setting a time point for transmitting a dangerous shaded area release signal based on object speed information of the object information.

6. The intersection traveling control apparatus of claim 5, wherein the instruction for transmitting the slow-down signal and the stop signal along the virtual stop line to the traveling vehicle further includes an instruction for redetecting whether or not there is the object moving in the travelable area.

7. The intersection traveling control apparatus of claim 6, wherein the instruction for transmitting the slow-down signal and the stop signal along the virtual stop line to the traveling vehicle further includes an instruction for resetting the virtual stop line and transmitting the slow-down signal and the stop signal to the traveling vehicle.

8. The intersection traveling control apparatus of claim 7, wherein the virtual stop line is closer to the traveling vehicle than an edge line reference of the internal area.

9. A method performed by an intersection traveling control apparatus to control entry of a traveling vehicle into an intersection according to shaded area setting at a non-traffic light intersection, the method comprising:
setting a traveling safety area of a traveling vehicle on a precision map pre-stored in the traveling vehicle;
setting a shaded area on the precision map based on data acquired through a sensor mounted on the traveling vehicle;
obtaining object information moving in a dangerous shaded area based on the data acquired through the sensor and setting an internal area and a virtual stop line corresponding to the object information and the dangerous shaded area;
transmitting a slow-down signal and a stop signal along the virtual stop line to the traveling vehicle; and
transmitting a dangerous shaded area setting release signal to the traveling vehicle based on the internal area and the object information,
wherein the virtual stop line indicates a position that is different from a position indicated by an actual stop line drawn on a road, and
wherein the obtaining of the object information moving in the dangerous shaded area and the setting of the internal area and the virtual stop line corresponding to the object information and the dangerous shaded area further include detecting an object moving from the dangerous shaded area to a travelable area.

10. The system of claim 2, wherein in the intersection traveling control apparatus, the operation for obtaining the object information moving in the dangerous shaded area and setting the internal area and the virtual stop line corresponding to the object information and the dangerous shaded area further includes an operation for obtaining object information based on the detected object.

11. The method of claim 9, wherein the obtaining of the object information moving in the dangerous shaded area and the setting of the internal area and the virtual stop line corresponding to the object information and the dangerous shaded area further include obtaining object information based on the detected object.

12. The method of claim 11, wherein the obtaining of the object information moving in the dangerous shaded area and the setting of the internal area and the virtual stop line corresponding to the object information and the dangerous shaded area further include setting the internal area and the virtual stop line based on object speed information of the object information.

13. The system of claim 10, wherein in the intersection traveling control apparatus, the operation for obtaining the object information moving in the dangerous shaded area and setting the internal area and the virtual stop line corresponding to the object information and the dangerous shaded area further includes an operation for setting the internal area and the virtual stop line based on object speed information of the object information.

14. The system of claim 13, wherein in the intersection traveling control apparatus, the operation for transmitting the slow-down signal and the stop signal along the virtual stop line to the traveling vehicle further includes an operation for setting a time point for transmitting a dangerous shaded area release signal based on object speed information of the object information.

15. The system of claim 14, wherein in the intersection traveling control apparatus, the operation for transmitting the slow-down signal and the stop signal along the virtual stop line to the traveling vehicle further includes an operation for redetecting whether or not there is the object moving in the travelable area.

16. The system of claim 15, wherein in the intersection traveling control apparatus, the operation for transmitting the slow-down signal and the stop signal along the virtual stop line to the traveling vehicle further includes an operation for resetting the virtual stop line and transmitting the slow-down signal and the stop signal to the traveling vehicle.

17. The system of claim 16, wherein the virtual stop line is closer to the traveling vehicle than an edge line reference of the internal area.

* * * * *